US007089402B2

(12) United States Patent  
Tanaka

(10) Patent No.: US 7,089,402 B2
(45) Date of Patent: Aug. 8, 2006

(54) INSTRUCTION EXECUTION CONTROL FOR VERY LONG INSTRUCTION WORDS COMPUTING ARCHITECTURE BASED ON THE FREE STATE OF THE COMPUTING FUNCTION UNITS

(75) Inventor: Sadahiro Tanaka, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 852 days.

(21) Appl. No.: 10/012,407

(22) Filed: Dec. 12, 2001

(65) Prior Publication Data

US 2003/0110201 A1    Jun. 12, 2003

(51) Int. Cl.
  *G06F 9/00*    (2006.01)
(52) U.S. Cl. .................... 712/24; 712/220; 718/102
(58) Field of Classification Search ........ 718/100–104; 712/24, 1, 200, 208, 220
  See application file for complete search history.

(56) References Cited

U.S. PATENT DOCUMENTS 6,044,450 A    3/2000    Tsushima et al. ............. 712/24

6,779,101 B1 *    8/2004    Berg et al. .................... 712/24

* cited by examiner

*Primary Examiner*—Chun Cao
(74) *Attorney, Agent, or Firm*—Fitzpatrick, Cella, Harper & Scinto

(57) ABSTRACT

Controlling an order of instructions executed by a VLIW computing architecture comprised of a plurality of computing functional units. A first VLIW instruction sequence is generated based on jobs selected from a job queue, each instruction field of the VLIWs corresponding to one of the computing functional units and containing a sequential instruction. The first VLIW sequence is sequentially executed by the computing architecture, and a detection is made if any of the computing functional units is in a free state. When at least one free computing functional units is detected, a second sequence of long instruction words is generated including instructions from a selected new job from the job queue for each such free computing functional unit. The second sequence of long instruction words is copied into the first sequence of long instruction words, and execution of the first sequence of long instruction words is resumed if it was halted.

20 Claims, 12 Drawing Sheets

| VLIW #(60) | INSTRUCTION FIELD F1 (61) | INSTRUCTION FIELD F2 (62) | INSTRUCTION FIELD F3 (63) | INSTRUCTION FIELD F4 (64) |
|---|---|---|---|---|
| 1 | A (SUB-INST.) | B (SUB-INST.) | C (SUB-INST.) | D (SUB-INST.) |
| 2 |  |  |  | NOP |
| 3 |  |  |  | NOP |
| 4 |  | NOP |  | NOP |
| 5 |  | NOP |  | NOP |
| 6 |  | NOP |  | NOP |
| 7 | NOP |  |  | NOP |
| 8 | NOP |  |  | NOP |

VLIW MEMORY 24
VLIW SEQUENCE 50

FIG. 3

| VLIW #(60) | INSTRUCTION FIELD F1 (61) | INSTRUCTION FIELD F2 (62) | INSTRUCTION FIELD F3 (63) | INSTRUCTION FIELD F4 (64) |
|---|---|---|---|---|
| 1 | A (SUB-INST.) | B (SUB-INST.) | C (SUB-INST.) | D (SUB-INST.) |
| 2 | | | | |
| 3 | | | | |
| 4 | | | | |
| 5 | | | | E (SUB-INST.) |
| 6 | | | | |
| 7 | | | | |
| 8 | | | | |
| 9 | | | | |
| 10 | | | | |
| 11 | | | | |
| 12 | NOP | NOP | | NOP |
| 13 | NOP | NOP | | |
| 14 | | NOP | | |

FIG. 4

INSTRUCTION EXECUTION CONTROL FOR VERY LONG INSTRUCTION WORDS COMPUTING ARCHITECTURE BASED ON THE FREE STATE OF THE COMPUTING FUNCTION UNITS

INCORPORATION BY REFERENCE

U.S. patent application Ser. No. 10/012,345, entitled "Multi-Mode Print Data Processing", filed concurrently herewith, is incorporated herein by reference.

BACKGROUND OF THE INVENTION

1. Field of the Invention

The invention concerns the management and control of the order of instruction codes for execution in a computing architecture comprised of a plurality of computing functional units, for completing a plurality of jobs in a job queue. Specifically, the invention concerns the efficient and dynamic generation and ordering of very long instruction words (VLIW) in a VLIW computing architecture so as to reduce the amount of idle time for each of the computing functional units.

2. Description of the Related Art

A VLIW computing architecture is typically comprised of multiple computing functional units, wherein each computing functional unit may be a separate arithmetic logic unit (ALU) or may be a portion of one CPU which has been divided into separate functional units. A VLIW system operates like a multi-processor system except that each functional unit shares a common program counter (PC). Such an architecture allows for the execution of multiple ALU-level instructions simultaneously, in parallel, during each machine cycle. In this manner, the overall processing speed of a VLIW computing architecture can be increased over that of a single, undivided CPU architecture. The multiple instructions are organized for distribution to the multiple computing functional units in sequence very long instruction words (VLIW).

The common ways in which a VLIW system is generally used include letting a code compiler make one composite program in which the program steps are executed in parallel across the multiple functional units of the VLIW, or to write specific programs which are tailored to run in parallel. The foregoing methodologies are very effective when it is possible to predict in advance the job balances among the multiple functional units. In such a situation, the predicted job balances can be used to write program codes which are tailored to the predicted job balances. Also, in such a situation, the predicted job balances can be used to notify compilers to optimize the program codes to achieve the job balances. However, in some situations, job balances cannot be predicted in advance at the time the program codes are written. The invention of the subject application addresses such a problem. In particular, the invention improves upon these two methods by utilizing many predetermined job combinations of program codes, and then having the task manager, or the real-time operating system (RTOS), as the case may be, choose and assign the best job combination to achieve the desired execution of programs in parallel in the VLIW.

For example, if the VLIW computing architecture includes four computing functional units, then each VLIW will include four separate sub-instructions, one for each computing functional units. In this manner, each VLIW is formatted into a plurality of instruction fields (four in the above example) each of which contains a sub-instruction for execution by a respective computing functional unit. A sequence of VLIWs therefore can represent a plurality of computing jobs for execution by the computing functional units, wherein each particular instruction field of the VLIWs contains a sequential instruction of one of the computing jobs for execution by a respective computing functional unit. Accordingly, each of the computing functional units in the VLIW architecture sequentially executes a respective computing job, wherein each computing job is comprised of a sequence of instructions. Each computing job is typically a portion, or page, of a single computer program.

Generally, operating systems (OS), real-time operating systems (RTOS), and task monitors include a task manager that generates a sequence of instructions which, when executed, carries out a series of computing jobs. The task manager obtains multiple computing jobs from a job queue and then creates a sequence of VLIW instructions wherein each instruction field of the VLIW instructions contains an instruction from one of the computing jobs. A program counter is used to keep track of the address location of the last computing job (program page) to be assigned to one of the computing functional units through incorporation into the sequence of VLIW instructions. In this manner, the task manager can check the address location stored in the program counter to determine which of the remaining computing jobs in the job queue should be incorporated into the next sequence of VLIW instructions, thereby allowing the computing jobs of the computer program to be executed in proper sequential order.

The above-described method for managing VLIW instructions for execution in a VLIW architecture can result in the inefficient use of the multiple computing functional units because VLIW systems share a common program counter. For instance, the multiple jobs represented in the sequence of VLIW instructions may be of different job code sizes, wherein one or more of the jobs will be completed before completion of the other jobs. Multiple jobs are of different sizes when they contain different numbers of sequential instructions. In such a case, the computing functional unit to which the completed job was assigned will be unused while the remaining jobs are completed. This is because, in each of the remaining VLIWs, the instruction field corresponding to the unused computing functional unit contains a no-operation instruction, while the other instruction fields corresponding to the other computing functional units contain operation instructions corresponding to the remainder of the uncompleted jobs. This results in the inefficient use of one or more of the computing functional units.

When one of the computing functional units is in a free, unused state, it is desirable to assign a new job to the unused computing functional unit in order to more efficiently use the resources of the VLIW architecture. However, when only one program counter is used to keep track of the last assigned instruction, it is not feasible to assign a new job to the unused computing functional unit before the other assigned jobs are completed because each functional unit (ALU) shares a common program counter. This would cause the task manager to load the next computing job out of sequence, instead of based on the next proper address location succeeding the last assigned job. Accordingly, the task manager must wait until all assigned jobs are completed by the execution of the current VLIW sequence until a new job can be assigned to the unused computing functional unit. The unused number of machine cycles in which the one or more computing functional units go unused results in overall inefficiency in the VLIW computing architecture.

SUMMARY OF THE INVENTION

The present invention addresses the foregoing problems by providing management and control of the order of instruction codes for execution in a computing architecture comprised of a plurality of computing functional units, for completing a plurality of jobs in a job queue, whereby the amount of unused machine cycles on each of the computing functional units is reduced. Specifically, the invention concerns the dynamic and efficient generation and ordering of very long instruction words (VLIW) for execution in a VLIW computing architecture so as to reduce the amount of idle time for each of the computing functional units.

Accordingly, one aspect of the invention concerns controlling an order of instructions executed by a computing architecture comprised of a plurality of computing functional units, for completing a plurality of jobs in a job queue. The invention includes selecting at least one job from the job queue for each of the computing functional units, each job containing a plurality of sequential instructions, and generating a first sequence of long instruction words based on the sequential instructions contained in the selected jobs, each long instruction word having a plurality of instruction fields, each instruction field corresponding to one of the computing functional units and containing a sequential instruction. The first sequence of long instruction words is sequentially executed by the computing architecture, each computing functional unit executing the sequential instruction in the corresponding instruction field of each long instruction word, and it is detected when each of the computing functional units are in a free state, when the first sequence of long instruction words is completed, and, in the case that the computing architecture includes a sub-processor, when the first sequence of long instruction words is being executed. The execution of the first sequence of long instruction words is halted, in the case that the computing architecture does not include a sub-processor, when at least one of the computing functional units is detected in a free state. A second sequence of long instruction words is generated, when at least one of the computing functional units is detected in a free state, the second sequence of long instruction words including instructions from a selected new job from the job queue for each computing functional unit detected to be in a free state. The second sequence of long instruction words is copied into the first sequence of long instruction words, and, in the case that the computing architecture does not include a sub-processor, execution of the first sequence of long instruction words is resumed by the plurality of computing functional units.

Preferably, a new job is selected for each of the computing functional units detected to be in a free, unused state. In addition, the execution of the first sequence of long instruction words is preferably halted by halting the sub-processor or by calling by the main processor an execution to the end of the sequence. The sequential instructions from the selected jobs are added to the instruction field in the second sequence of long instruction words corresponding to each computing functional unit detected to be in a free state. In addition, each of the jobs are preferably of substantially the same size, or can be half the size of other jobs, such that two jobs can be scheduled in place of one job. Also, predetermined job combination codes are preferably utilized to assist in the selection of jobs to be incorporated in a sequence of long instruction words, wherein a temporary job is created to fill in for a job code which does not have a corresponding job in the job queue.

By virtue of the foregoing, the efficiency of a VLIW computing architecture system can be increased by reducing the amount of time that each of the functional computing units are unused. The present invention allows the long instruction words to be generated and organized without manual intervention in order to efficiently use each of the computing functional units of a VLIW computing architecture.

According to another aspect, the invention concerns controlling an order of instructions executed by a computing architecture comprised of a plurality of computing functional units, for completing a plurality of jobs in a job queue, each job containing a plurality of sequential instructions. The invention includes sequentially executing a first sequence of long instruction words based on the sequential instructions contained in a set of selected jobs, each long instruction word having a plurality of sub-instruction fields, each sub-instruction field corresponding to one of the computing functional units and containing a sequential instruction for execution by the corresponding computing functional unit, and detecting when all of the computing functional units are in a free state. When all of the computing functional units are in a free state, a second sequence of long instruction words is generated, the second generating step including selecting a new job from the job queue for each of the computing functional units detected to be in a free state, halting execution of the first sequence of long instruction words, creating a second sequence of long instruction words from the instructions from each selected new job, and copying the second sequence of long instruction words into the first sequence of long instruction words, and resuming execution of the first sequence of long instruction words.

Preferably, each of the jobs are preferably of substantially the same size, or are half the size of other jobs, such that two jobs can be executed in one functional unit in substantially the same time that one job is executed in anther functional unit. Also, predetermined job combination codes are preferably utilized to assist in the selection of jobs to be incorporated in a sequence of long instruction words, wherein a temporary job is created to fill in for a job code which does not have a corresponding job in the job queue.

By virtue of the foregoing, the efficiency of a VLIW computing architecture system can be increased by reducing the amount of time that each of the functional computing units are unused. The present invention allows the long instruction words to be generated and organized without manual intervention in order to efficiently use each of the computing functional units of a VLIW computing architecture.

According to yet another aspect, the invention concerns controlling an order of instructions executed by a computing architecture comprised of a plurality of computing functional units, for completing a plurality of jobs in a job queue. At least one job is selected from the job queue for each of the computing functional units, by identifying the remaining types of jobs in the job queue, selecting a job combination from a set of predetermined job combinations, each predetermined job combination containing a plurality of codes each of which corresponds to a type of job containing a substantially same number of sequential instructions, selecting a job from the job queue which corresponds to each code in the selected job combination, and creating, in the event that the job queue does not contain a job corresponding to one of the codes in the selected job combination, a selected temporary job which corresponds to the code for which there is no corresponding job in the job queue. A sequence of long instruction words is generated based on the sequential instructions contained in the selected jobs, each long instruction word having a plurality of instruction fields, each instruction field corresponding to one of the computing functional units and containing a sequential instruction. The sequence of long instruction words is sequentially executed by the computing architecture, each computing functional unit executing the sequential instruction in the corresponding instruction field of each long instruction word.

Preferably, each of the jobs contain the same number of sequential instructions. Also, selected predetermined job combination preferably contains codes which correspond to a set of jobs which are at the front of the job queue. In addition, the selected jobs preferably correspond to a predetermined program.

By virtue of the foregoing, the efficiency of a VLIW computing architecture system can be increased by reducing the amount of time that each of the functional computing units are unused. The present invention allows the long instruction words to be generated and organized without manual intervention in order to efficiently use each of the computing functional units of a VLIW computing architecture.

Another aspect of the invention is directed to controlling an order of instructions executed by a computing architecture comprised of a plurality of computing functional units, for completing a plurality of jobs in a job queue. This aspect of the invention includes executing a first sequence of long instruction words, each long instruction word containing a plurality of sub-instructions, each computing functional unit executing a corresponding sub-instruction, and detecting the end of the first sequence of long instruction words. A next job is selected from the job queue for a first one of the computing functional units, and then a job from the job queue is selected for each of the remaining ones of the computing functional units, each selected job being of a same job-code size. A second sequence of long instruction words is generated based on instructions contained in each of the selected jobs, and the second sequence of long instruction words is copied into the first sequence of long instruction words, and execution of the first sequence of long instruction words is resumed by the computing architecture.

Preferably, each of the jobs contain the same number of sequential instructions. Also, the selected jobs are preferably selected in order from the front of the job queue based on job size.

By virtue of the foregoing, the efficiency of a VLIW computing architecture system can be increased by reducing the amount of time that each of the functional computing units are unused. The present invention allows the long instruction words to be generated and organized without manual intervention in order to efficiently use each of the computing functional units of a VLIW computing architecture.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 3 is a block diagram illustrating a first VLIW instruction set according to one embodiment of the present invention.

FIG. 4 is a block diagram illustrating a second VLIW instruction set according to one embodiment of the present invention.

DETAILED DESCRIPTION OF THE PREFERRED EMBODIMENTS

Figure 1A:
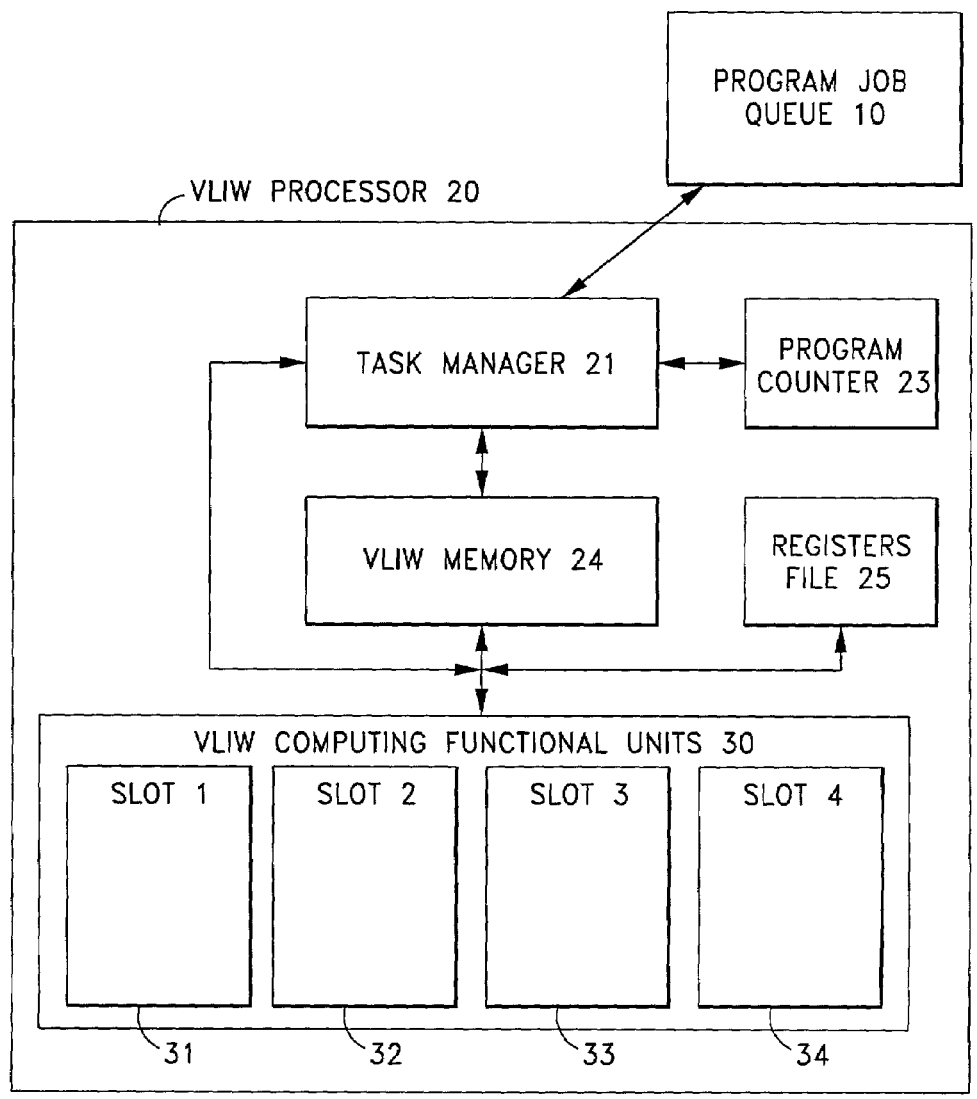
FIG. 1A is a block diagram which depicts one embodiment of a VLIW processor system in which the present invention may be practiced.
Figure 1B:
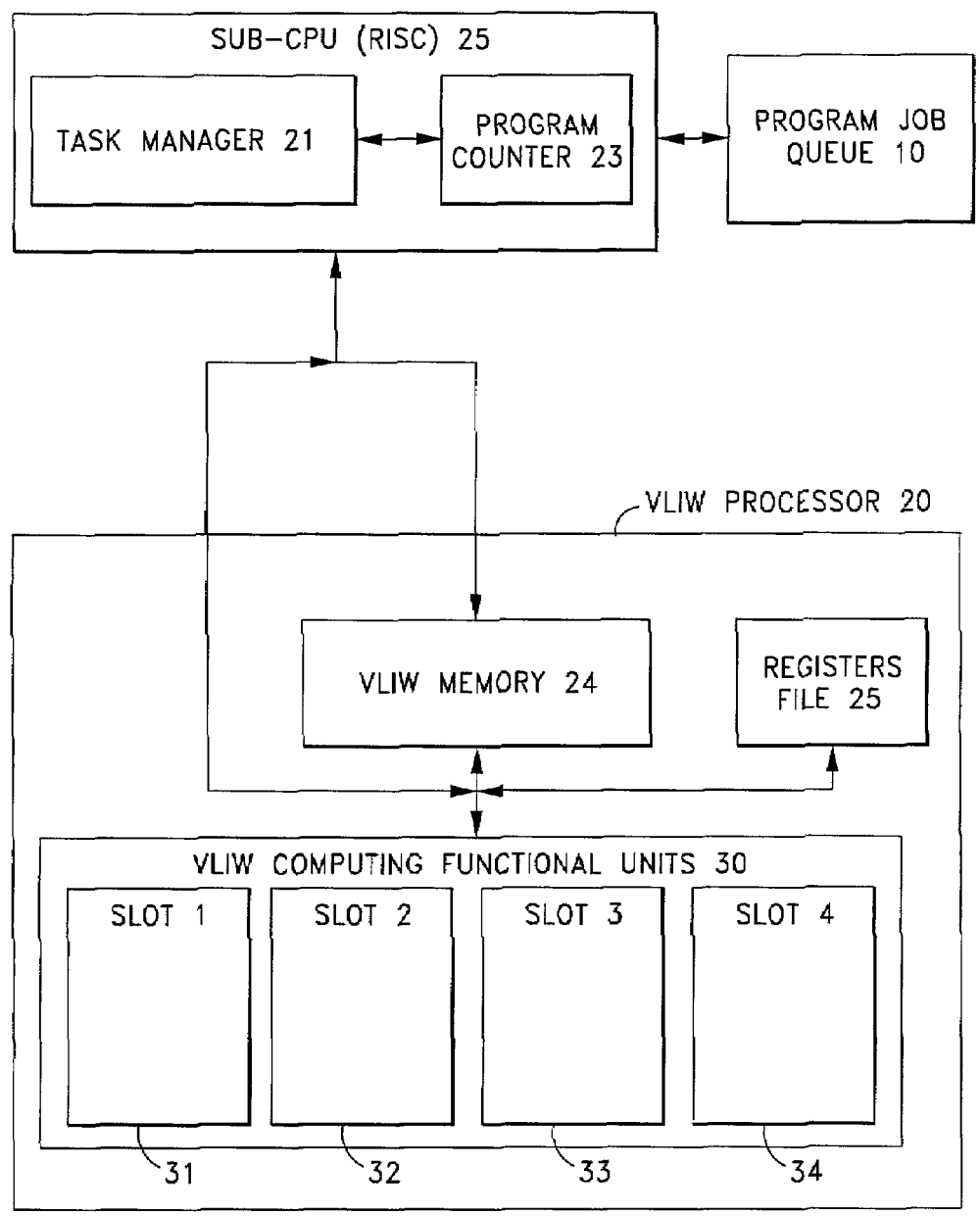
FIG. 1B is a block diagram which depicts another embodiment of a VLIW processor system in which the present invention may be practiced.

FIGS. 1A and 1B depict two different embodiments of a VLIW processor system in which the present invention may be practiced. Of course, it should be appreciated that the present invention is not limited to the embodiments depicted in FIGS. 1A and 1B, but may generally be utilized in any VLIW processor system or similar multi-processor system, such as a multi-CPU system.

Referring to FIG. 1A, a VLIW processor system is shown which is comprised of program job queue 10 and VLIW processor 20. Program job queue 10 is a memory for storing a plurality of program jobs which together comprise one or more executable programs. For example, a single executable program can be divided into a plurality of executable program jobs, each of which represents a segment, or page, of the single executable program. Each program job is made up of a plurality of sequential instructions. In this manner, a single executable program can be comprised of many individually executable program jobs, each of which can be executed in an assigned computing functional unit of VLIW processor 20.

Depending on the interrelationships between the individual program jobs comprising the single executable program, the program jobs may be executed in parallel or may be required to execute sequentially. For example, if one of the program jobs calculates the value of a variable which is used by the next program job, then the two program jobs must be executed sequentially. On the other hand, if the two program jobs do not have a sequential interdependency, then they can be executed in parallel. Accordingly, those program jobs that can be executed in parallel can be assigned to the various computing functional units of VLIW processor 20 for parallel execution in order to reduce the overall processing time of the single executable program as compared with sequential execution of the jobs in a single processor.

Returning the FIG. 1A, it can be seen VLIW processor 20 includes VLIW computing functional units 30, task manager 21, program counter 23, VLIW memory 24 and registers files 25. At the core of VLIW processor 20 is VLIW computing functional units 30, which is comprised of a plurality of computing functional units. In the embodiment illustrated in FIG. 1A, there are four computing functional units in VLIW computing functional units 30. Of course, it can be appreciated that VLIW computing functional units 30 can be comprised of a different number of computing functional units, such as six, eight, ten, etc. In the embodiment depicted in FIG. 1A, VLIW computing functional units 30 is comprised of computing functional units 31, 32, 33 and 34, which are also referred to as slots 1, 2, 3, and 4, respectively.

Computing functional units 31 to 34 are capable of executing independently of each other, and can even be comprised of different types of processors. For example, computing functional units 31 and 32 may be comprised of floating point calculation units for performing floating point calculation instructions, and computing functional units 33 and 34 may be comprised of fixed point calculation units for performing fixed point calculation instructions. In the alternative, computing functional units 31 to 34 may all be comprised of the same type of calculation units, or be a different combination of various types of calculation units, including load/store units to handle retrieval of data, and storing of data, to memory. Computing functional units 31 to 34 may also be comprised of a single processor (CPU) that has been petitioned into four sub-processors which are capable of operating independently of each other.

Task manager 21 monitors and manages the execution of instructions in VLIW computing functional units 30. In particular, task manager 21 retrieves a selected plurality of program jobs from program job queue 10, each program job corresponding to each of VLIW computing functional units 30. Task manager 21 then organizes the sequential instructions contained in the selected program jobs into a sequence of very long instruction words (VLIWs). Each VLIW is comprised of a plurality of instruction fields, each of which contains one of the sequential instructions, or a sub-instruction, from the corresponding program job. Each instruction field corresponds to one of VLIW computing functional units 30. In this manner, a VLIW contains sub-instructions for each of VLIW computing functional units 30 to be executed in parallel in a single machine cycle. The next VLIW in the VLIW sequence is accessed and executed by VLIW computing functional units 30 in the next machine cycle, and the process continues until all VLIWs in the VLIW sequence have been executed or until task manager 21 determines that the VLIW sequence should be modified, as described in more detail herein. In this regard, task manager 21 also monitors the status of VLIW computing functional units 30 to determine if one or more of computing functional units is not being utilized.

The sequence of VLIWs generated by task manager 21 is stored in VLIW memory 24 for access and execution by VLIW computing functional units 30, as described above. As seen in FIG. 1A, the sub-instruction of each instruction filed in a VLIW is transferred to corresponding computing functional units 31 to 34 by means of a data bus between VLIW memory 24 and VLIW computing functional units 30. In addition, registers file 25 is provided as a memory for maintaining registers which are used by each of computing functional units 31 to 34 during their respective execution of the sub-instructions in the sequence of VLIWs.

Lastly, program counter 23 is used to track the address of the last program job (page) to be accessed by task manager 21 for inclusion into a sequence of VLIWs. In this manner, program counter 23 allows task manager 21 to identify the next program job in program job queue 10 that should be accessed next for inclusion into the sequence of VLIWs. It should be appreciated that program counter 23 is shared for all of computing functional units 31 to 34, and therefore cannot be used to track the last address of the program job being executed by any particular one of computing functional units 31 to 34. For example, if computing functional unit 31 completes execution of a program job which has a jump instruction near the end, then task manager 21 cannot simply grab from program job queue 10 the program job starting with the "jump to" address. If task manager 21 were to do this, then program counter 23 would be set to the "jump to" address and could not be used to obtain the next appropriate program jobs for the other computing functional units. Instead, program counter 23 is only used to track the last address of the last program job accessed by task manager 21, regardless of which one of computing functional units 31 to 34 was utilized to execute the program job.

The VLIW processor system of FIG. 1A can therefore access a plurality of program jobs which comprise a single executable program and assign the jobs to computing functional units 31 to 34, respectively through the use of the instruction fields in a generated sequence of VLIWs. The single executable program can therefore be executed in parallel thereby reducing the overall execution time in comparison to sequential execution by a single processor.

FIG. 1B is a another embodiment of a VLIW processor system in which the present invention can be practiced. This embodiment is essentially the same as that of FIG. 1A, with the exception that task manager 21 and program counter 23 are implemented on a separate processor than VLIW processor 20. In FIG. 1B, it can be seen that task manager 21 and program counter 23 reside in sub-processor 25. Preferably, sub-processor 25 is a reduced instruction set chip (RISC), although it should be appreciated that sub-processor 25 can be another type of processor, such as a floating point calculation unit or a fixed point calculation unit.

The VLIW system of FIG. 1B is otherwise the same as that of FIG. 1A, and the details of the other components in FIG. 1B will therefore not be discussed further. In general, the VLIW processor system of FIG. 1B has the advantage that task manager 21 has its own dedicated processor to perform task management, such as preparing a next sequence of VLIWs, without necessarily disrupting ongoing execution of VLIWs within VLIW computing functional units 30. For example, in the VLIW processor system of FIG. 1B, task manager 21 is executed on one of computing functional units 31 to 34, and therefore, VLIW computing functional units 30 are halted from executing VLIWs when it is necessary for task manager 21 to execute. Accordingly, VLIW computing functional units 30 preferably generates an interrupt when it is done executing a sequence of VLIWs, when on of computing functional units 31 to 34 is idle, or when an error condition occurs. Upon such an interrupt, VLIW computing functional units 30 halts execution of the sequence of VLIWs, if necessary, and executes task manager 21.

In the VLIW processor system of FIG. 1B, task manager 21 can execute full time on sub-processor 25, independent of execution of VLIWs by VLIW computing functional units 30. Accordingly, task manager 21 can prepare a next sequence of VLIWs for execution by VLIW computing functional units 30 or can simply monitor for completion of execution by VLIW computing functional units 30, for an idle condition of one of computing functional units 31 to 34, or for an error condition in one of computing functional units 31 to 34.

Figure 2:
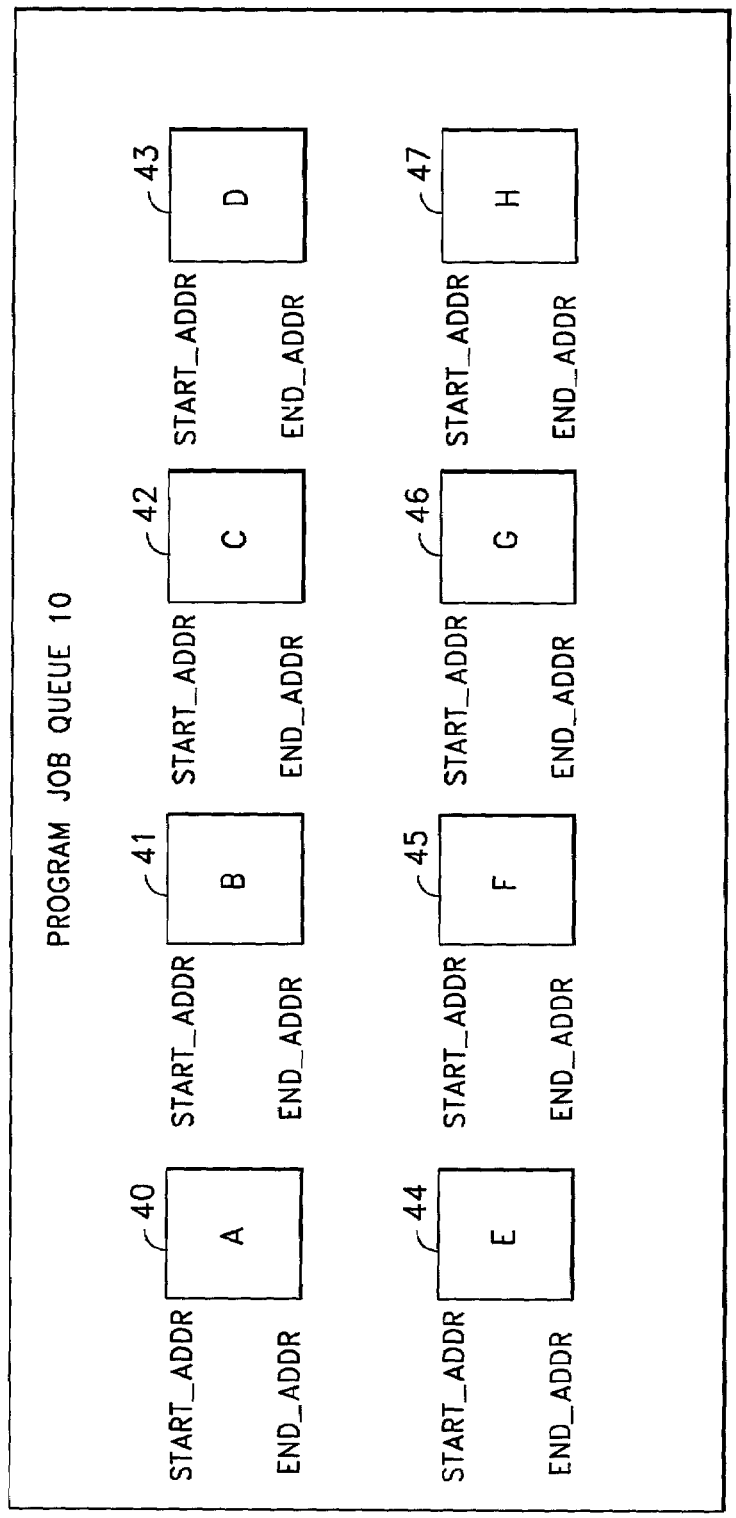
FIG. 2 is a block diagram illustrating a program job queue according to one embodiment of the present invention.

FIG. 2 depicts program job queue 10. In particular, as seen in FIG. 2, program job queue 10 contains program jobs 40 to 47, which together preferably comprise a single executable program. Of course, many other program jobs can be included in program job queue 10 and only program jobs 40 to 47 are depicted in FIG. 2 for ease of explanation. Program jobs 40 to 47, identified as jobs A to H, respectively, each have a start address and an end address. Accordingly the end address of each job is offset from the job's start address by the number of instructions contained in the job. It can be appreciated that program job queue 10 may contain program jobs of various sizes and types.

In a program that often performs similar functions throughout the execution of the program, several of the jobs comprising the program may be of the same type and size. For example, one such common function may consist of comparing two numbers and determining the larger of the two numbers. In such a case, several of program jobs 40 to 47 may be comprised of this common function, thereby including the same, or similar, sequence of instructions and having a same, or similar, execution time. In the alternative, each of program jobs 40 to 47 may be unique and therefore have a completely unique sequence of instructions and as well as a unique execution time.

As discussed above, task manager 21 accesses program jobs 40 to 47 and then selects certain of the jobs to incorporate into a sequence of VLIWs for execution by VLIW computing functional units 30. For example, task manager 21 may select program jobs 40 to 43 for execution by each of computing functional units 31 to 34, respectively. Task manager 21 would thereupon generate a sequence of VLIWs which incorporate the instructions from each of program jobs 40 to 43 into the corresponding instruction fields of each VLIW for execution by a corresponding computing functional unit. In this example, computing functional unit 31 would effectively execute program job 40 by consistently executing the sub-instruction contained in the first instruction field of the sequence of VLIWs generated by task manager 21.

FIG. 3 is a depiction of a first sequence of VLIWs to be executed by VLIW computing functional units 30 according to one example of the present invention. As seen in FIG. 3, a first VLIW sequence 50 is stored in VLIW memory 24. VLIW sequence 50 was generated by task manager 21 by selecting program jobs A, B, C and D, 40 to 43, from program job queue 10 and generating each VLIW in VLIW sequence 50 based on the instructions in each of jobs A, B, C and D. In particular, VLIW sequence 50 is comprised of fourteen VLIWs, each of which is identified by VLIW number 60 and includes instruction fields F1 through F4, 61 to 64.

Instruction field F1 contains a sub-instruction, preferably in assembly language, of program job A. In a similar manner, instruction field F2 contains a sub-instruction of program job B, instruction field F3 contains a sub-instruction of program job C, and instruction field F4 contains a sub-instruction of program job D. Accordingly, each VLIW contains a sub-instruction in each of instruction fields F1 to F4 for execution by a corresponding one of VLIW computing functional units 30. Each machine cycle, the next VLIW of VLIW sequence 50 is passed to VLIW computing functional units 30 for execution. In this manner, the instructions in each of jobs A to D are sequentially executed in each respective one of VLIW computing functional units 30, such that jobs A to D are effectively executed on parallel across the computing functional units.

As can be seen in FIG. 3, jobs A to D are of different sizes due to the different numbers of sequential instructions contained in each. Job A in instruction field 61 contains twelve instructions, Job B in instruction field 62 contains eleven instructions, Job C in instruction field 63 contains fourteen instructions, and Job D in instruction field 64 contains only five instructions. It can be appreciated that efficiency is gained by having four segments of a single program, jobs A to D, being executed in parallel by four processors as opposed to executing the jobs one at a time in a single processor.

However, it can be seen in FIG. 3 that some inefficiency exists because one or more of VLIW computing functional units 30 are unused during some of the machine cycles during the execution of VLIW sequence 50. The longest job represented by VLIW sequence 50 is job C which is fourteen instructions, and therefore the total length of VLIW sequence 50 is fourteen VLIWs which are executed in fourteen machine cycles. Because the other jobs, A, B, and D are shorter than job C, no-operation (NOP) instructions are placed in their respective instruction fields after their last instructions, respectively. The NOPs are used to instruct the respective ones of VLIW computing functional units 30 that they have no instructions to execute until the completion of execution of VLIW sequence 50.

The present invention addresses the inefficiency of having one or more of VLIW computing functional units 30 sit idle during significant numbers of machine cycles. In particular, in the present invention, task manager 21 is made aware that computing functional unit 34 is idle after job D is completed in five machine cycles. Likewise, task manager 21 next becomes aware that computing functional unit 32 is idle after job B is completed in eleven machine cycles and that computing functional unit 31 is idle after job A is completed in twelve machine cycles. When task manager 21 is part of VLIW processor 20, as in FIG. 1A, task manager 21 is made aware of the idle status of one or more of the computing functional units by being provided with an interrupt from the respective computing functional unit when it becomes idle. In such a situation, the respective computing functional unit triggers an interrupt for VLIW computing functional units 30, which then halts processing of VLIW sequence 50 and resumes execution of task manager 21 in order to modify VLIW sequence 50. Such an interrupt may also be triggered by VLIW computing functional units 30 when execution of VLIW sequence 50 is completed, in which case task manager 21 accesses a new set of jobs from program job queue 10 and then generates a new sequence of VLIWs for execution by VLIW computing functional units 30.

In a similar manner, when task manager 21 is not part of VLIW processor 20 but instead executes on a dedicated sub-processor, such as sub-processor 25 in FIG. 1B, task manager 21 is made aware of an idle status of one of the computing functional units by being provided with a message from the respective computing functional unit when it becomes idle. In such a situation, the respective computing functional unit triggers a message to task manager 21 which then instructs VLIW computing functional units 30 to halt processing of VLIW sequence 50 while task manager 21 modifies VLIW sequence 50. Such an interrupt may also be triggered by VLIW computing functional units 30 when execution of VLIW sequence 50 is completed, in which case task manager 21 accesses a new set of jobs from program job queue 10 and then generates a new sequence of VLIWs for execution by VLIW computing functional units 30.

After receiving an interrupt, or a message as the case may be, that one of VLIW computing functional units 30 is idle in a free state, task manager 21 then proceeds to modify VLIW sequence 50 in order to add instructions from a new job to the instruction field corresponding to the idle computing functional unit. In either case, when task manager 21 is made aware that computing functional unit 34 is in a free state, task manager 21 makes a copy of the remaining unexecuted VLIWs of VLIW sequence 50. Task manager 21 then accesses program job queue 10 to obtain a next program job which has a number of instructions that are capable of being completely executed within the unexecuted remainder of VLIW sequence 50. For example, upon review of FIG. 3, it can be seen that when job D has is complete, job C has nine machine cycles left to complete. Accordingly, a new job of up to nine instructions can be incorporated into instruction field 64 of the copied remainder VLIW sequence 50.

For purposes of illustration, program job E of program job queue 10 contains eight instructions and is therefore selected by task manager 21 to incorporate into the copied remainder of VLIW sequence 50. In this regard, task manager 21 modifies the copied remainder of VLIW sequence 50 by adding the next sequential instruction from job E into instruction field 64 of each remaining VLIW. In this manner, machine cycles of computing functional unit 34 that would otherwise be wasted during the completion of VLIW sequence 50 are utilized to execute the instructions of job E. The modified remainder of VLIW sequence 50 is then copied into the original VLIW sequence 50 so that execution can resume on the next VLIW after the location where execution was previously halted.

FIG. 4 is a depiction of the post-modification version of VLIW sequence 50 in which the instructions of job E have been incorporated as described above. As seen in FIG. 4, the instructions of job E have sequentially been incorporated into instruction field 64 of VLIW sequence 50 after those of job D. VLIW computing functional units 30 are then instructed by task manager 21 to resume execution of VLIW sequence 50 at VLIW number six, which is the next VLIW after the completion of job D, where execution was previously halted. It can be appreciated that the modified VLIW sequence 50 is more efficient that original VLIW sequence 50 because an addition job, job E, is not executed along with jobs A to D in the same number of machine cycles. Accordingly, only six NOPs are needed in modified VLIW sequence 50 of FIG. 4, as compared with the fourteen NOPs utilized in original VLIW sequence 50 of FIG. 3.

Figure 5:
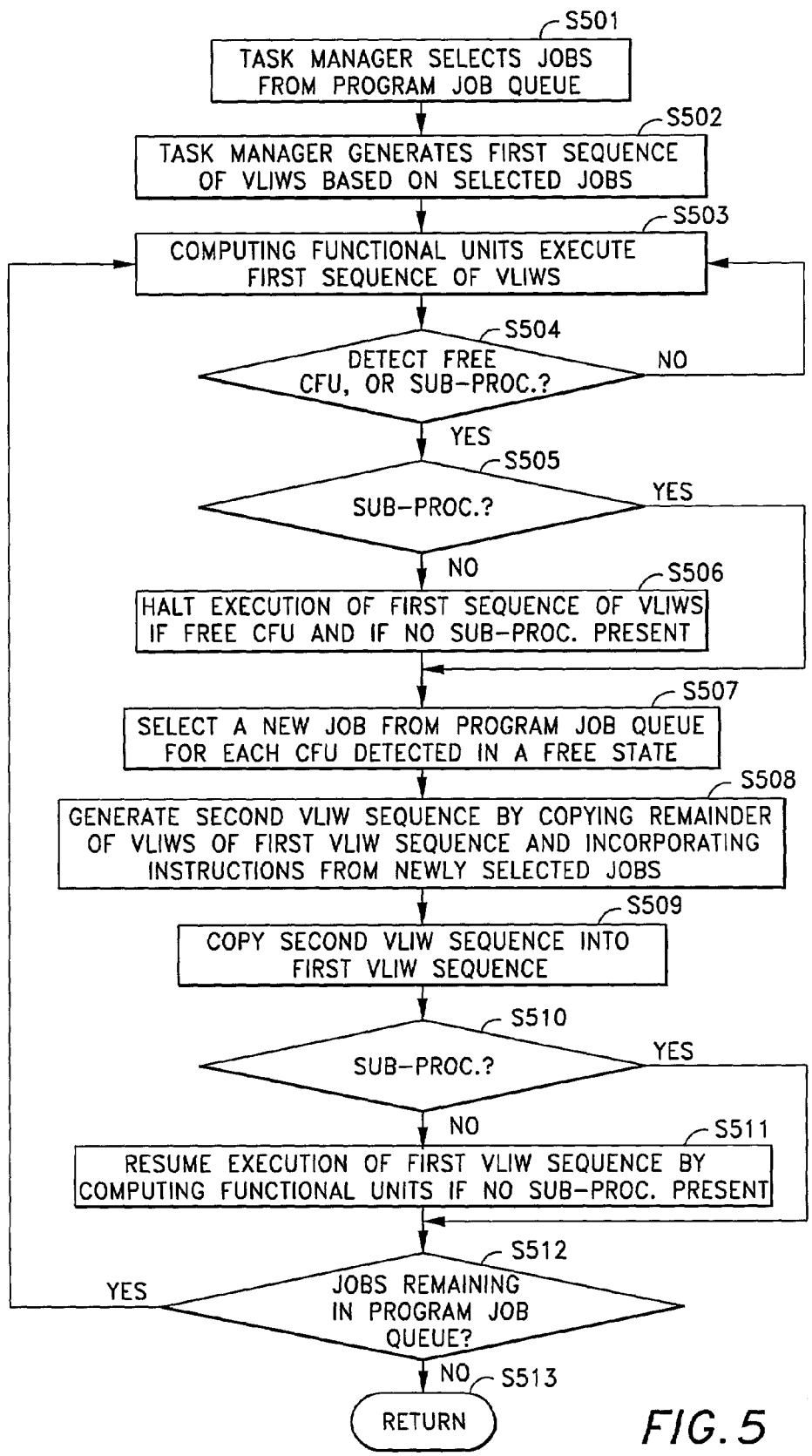
FIG. 5 is a flowchart for explaining dynamic modification of a VLIW sequence according to one embodiment of the present invention.

FIG. 5 is a flowchart which illustrates the above described process of the present invention. In step S501, task manager 21 accesses program job queue 10 and selects a job for each of VLIW computing functional units 30. In the example described above, jobs A, B, C and D are selected. Next, in step S502, task manager 21 generates a first sequence of VLIWs based on the instructions contained in the selected jobs. As described above, an instruction from each of the selected jobs is placed in each corresponding instruction field of each VLIW in the VLIW sequence. VLIW computing functional units 30 are then instructed to execute the VLIW sequence whereby each computing functional units executes the instruction in the corresponding field of the VLIW currently being executed (step S503).

In step S504, VLIW computing functional units 30 detects whether one or more of the computing functional units is in a free state such that it is idle with nothing but NOPs for the rest of the VLIW sequence. In addition, the detection of a free state can include the condition when execution of the VLIW sequence has been completed for all of the computing functional units. It is also detected in step S504 whether the computing architecture includes a sub-processor, such as sub-cpu (RISK) 25 of the computing architecture shown in FIG. 1B. If there has not been a detection that a computing functional unit is in a free state, or that the computing architecture includes a sub-processor, flow passes to step S503 in which case VLIW computing functional units 30 continue to execute the first VLIW sequence. If there has been a detection that a computing functional unit is in a free state, or that the computing architecture includes a sub-processor, flow passes to step S505. In step S505, it is determined whether a sub-processor has been detected, and if not, flow passes to step S506 in which case the execution of the first VLIW sequence is halted, thereby freeing up the computing functional units for modification of the first VLIW sequence. If it is determined that a sub-processor has been detected, flow passes directly to step S507 and the execution of the first VLIW sequence not halted because the sub-processor can be used for modification of the first VLIW sequence. As discussed above, task manager 21 can be made aware of the detection by an interrupt when task manager 21 is executed on VLIW processor 20, or by a message when task manager 21 executes independently on dedicated sub-processor 25.

In step S507, task manager 21 accesses program job queue 10 and selects a new job for each of the computing functional units detected to be in a free state. Preferably, each job is selected based on its size so that it can be incorporated within the VLIW sequence without requiring additional VLIWs to be added to the end of the VLIW sequence. Task manager 21 then generates a second VLIW sequence by copying the unexecuted remainder of the first VLIW sequence and incorporating the instructions from each newly selected job into the corresponding instruction field of the VLIW sequence (step S508). The second VLIW sequence is then copied into the first VLIW sequence at the location where the remaining VLIWs were copied from (step S509).

In step S510, it is determined if a sub-processor was detected to be present in the computing architecture. If a sub-processor is present, flow passes directly to step S512 because resumption of execution is not necessary as the computing functional units were not halted for modification of the first VLIW sequence. If a sub-processor is not present, flow passes to step S511 in which execution of the modified first VLIW sequence is resumed by the computing functional units. The resumption of execution is accomplished by task manager 21 relinquishing control of VLIW computing functional units 30 for execution in the case where task manager 21 executes in VLIW processor 20. In step S512, it is determined if there are jobs remaining in program job queue 10 that have not yet been incorporated into a VLIW sequence for execution by VLIW computing functional units 30. If so, flow passes to step S503 in which VLIW computing functional units 30 continue to execute the modified first VLIW sequence. If there are no jobs remaining in program job queue 10 that have not yet been incorporated into a VLIW sequence for execution, then flow passes to return in step S513.

In this manner, the present invention provides for the dynamic generation and modification of VLIW sequences so that all computing functional units of VLIW processor 20 are effectively used in an efficient manner to execute instructions of jobs in a program job queue. It can be appreciated that, although the above described example involved modifying the first VLIW sequence to incorporate instructions of one additional job, the present invention can incorporate instruction of an additional job for each computing functional units detected to be in a free state. Accordingly, if two computing functional units 31, 32, and 34 are all detected to be in a free state while computing functional unit 33 is still executing instructions, then three additional jobs are selected from program job queue 10 and incorporated into the first VLIW sequence. Also, as described above, VLIW computing functional units 30 can be comprised of other numbers and types of processors, and therefore the present invention can modify the first VLIW sequence to incorporate newly selected jobs for however many computing functional units are detected to be in a free state, thereby reducing inefficiency during execution of the VLIW sequence.

In another aspect of the invention, task manager 21 can generate a VLIW sequence based on jobs which are selected from program job queue 10 based on predetermined combinations of jobs, whereby each predetermined job combination is preferably comprised of certain sized jobs such that each of the computing functional units will execute the same, or substantially the same, number of instructions by the end of the VLIW sequence. In this manner, none, or few, machine cycles of any given computing functional unit are wasted during execution of the VLIW sequence. In this aspect, the plurality of jobs in program job queue 10 can be easily identified by job type, and then a set of jobs are selected from program job queue 10 based on their priority position within the queue and based on a matching predetermined job combination.

The selected jobs are used to generate a VLIW sequence which is then executed by VLIW computing functional units 30. After execution of the first VLIW sequence, the process is repeated and a next VLIW sequence is generated and executed based on selected jobs corresponding to a particular predetermined job combination. The process is repeated until all jobs in program job queue 10 are accessed and executed.

Figure 6:
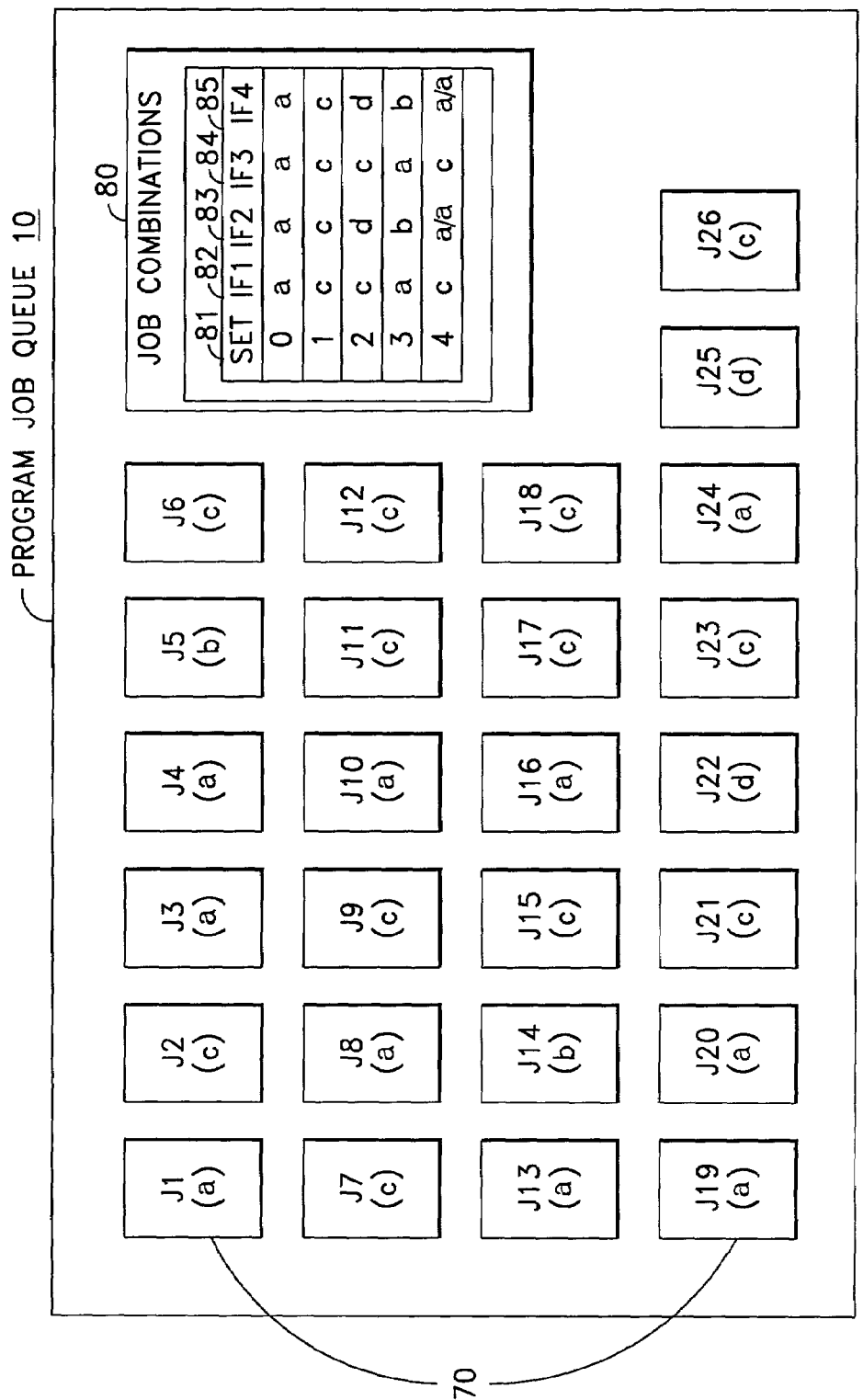
FIG. 6 is a block diagram illustrating a program job queue according to a second embodiment of the present invention.

FIG. 6 illustrates this aspect of the invention. In particular, FIG. 6 shows program job queue 10 according to this aspect of the invention, wherein program job queue 10 includes a plurality of program jobs 70 and a plurality of predetermined job combinations. As seen in FIG. 6, program jobs 70 are comprised of jobs identified as J1 to J26, which include jobs of either type "a", "b", "c" or "d". Accordingly, each job of type a consists of the same, or substantially similar, function and therefore contains the same, or substantially similar, instructions. Within the twenty-six jobs of program jobs 70, there are ten jobs of type "a", two jobs of type "b", twelve jobs of type "c", and two jobs of type "d".

Job combinations 80 is comprised of a plurality of predetermined job combinations wherein each job combination contains a set identifier 81 and instruction fields IF1 to IF4, 82 to 85. A code representing a job type is provided in each of instruction fields IF1 to IF4. Preferably, each job combination contains a set of job types that have the same, or a substantially equal, number of instructions so that all computing functional units complete execution of their respective instructions in the VLIW sequence at the same, or substantially the same, time. For example, the job combination identified by set 0 contains the job type "a" in each of instruction fields IF1 to IF4. Accordingly, this job combination would generate a VLIW sequence which would have all computing functional units executing jobs of type a in parallel. In such a job combination, all computing functional units would be fully utilized throughout the execution of the VLIW sequence and would finish execution of instructions at the same time.

Similarly, job combination 1 consists of a job of type "c" in each of instruction fields F1 to F4. Job combinations 2, 3 and 4 are each comprised of a heterogeneous mix of two different job codes. Preferably, the two job codes of each of combinations 2, 3 and 4 represent job types that have a substantially similar number of instructions so that all computing functional units are utilized efficiently during execution of a VLIW sequence based on the job combination. For example, in job combination 2, jobs of type "c" and "d" preferably contain a substantially similar number of instructions. Similarly, in job combination 3, jobs of type "a" and "b" preferably contain a substantially similar number of instructions.

Job combination 4 is a unique example of a job combination in that it contains two jobs of type "c" and four jobs of type "a". This is because the type "a" jobs contain approximately one-half the number of instructions as the type "c" jobs, and therefore can be executed in approximately one-half the time of the type "c" jobs. As seen in job combination 4, instruction field IF 1 contains one job of type "c", instruction field IF 2 contains two jobs of type "a", instruction field IF 3 contains one job of type "c", and instruction field IF 4 contains two jobs of type "c". Based on the above descriptions of job types "a" and "c", it can be appreciated that a VLIW sequence which is based on selected jobs that match each job type in job combination 4 will keep all computing functional units efficiently executing in parallel because two type "a" jobs can execute in substantially the same time as one type "c" job.

In this manner, task manager 21 uses job combinations 80 to determine which next set of jobs to select from program job queue 10 for generation of a next VLIW sequence for execution by VLIW computing functional units 30. In particular, task manager 21 accesses program job queue 10 and identifies the remaining jobs to be executed and their respective job types. Task manager 21 then reviews job combinations 80 and determines a best job combination to use next based on the identified remaining job types and on a predetermined rule set.

Preferably, the rule set includes based on the following order of priorities: (1) select a job combination that has the same job type in all instruction fields when possible, thereby achieving a full level of parallelism among all computing functional units; (2) if option (1) is not possible, then select a job combination having more than one type of job in the instruction fields; and (3) if there are not sufficient remaining unexecuted jobs to match any of the job combinations, then select a job combination which has the most matching remaining jobs. In the case of option (3), a dummy job is used for any job type in the job combination which does not a matching remaining job. A dummy job preferably consists of a series of no-operation codes (NOPs) and is created as needed, and then is discarded after execution of the VLIW sequence based on the selected jobs corresponding to the selected job combination.

Task manager 21 then selects a job from program job queue 10 which corresponds to each job code in the selected predetermined job combination. If a job code exists in the predetermined job combination for which there is no matching remaining job in program job queue 10, then a selected temporary dummy job as described above is created. Next, task manager 21 generates a VLIW sequence based on the sequential instructions in the selected jobs that correspond to the job codes of the selected predetermined job combination. Each instruction field of the VLIWs represents one of the jobs, as discussed above, and also corresponds to one of the computing functional units of VLIW computing functional units 30. The generated VLIW sequence is then executed such that, for each VLIW, each computing functional unit executes the sequential instruction contained in the corresponding instruction field of the VLIW. Task manager 21 then repeats the process to generate a next VLIW sequence for execution until there are no remaining program jobs in program job queue 10.

Figure 7:
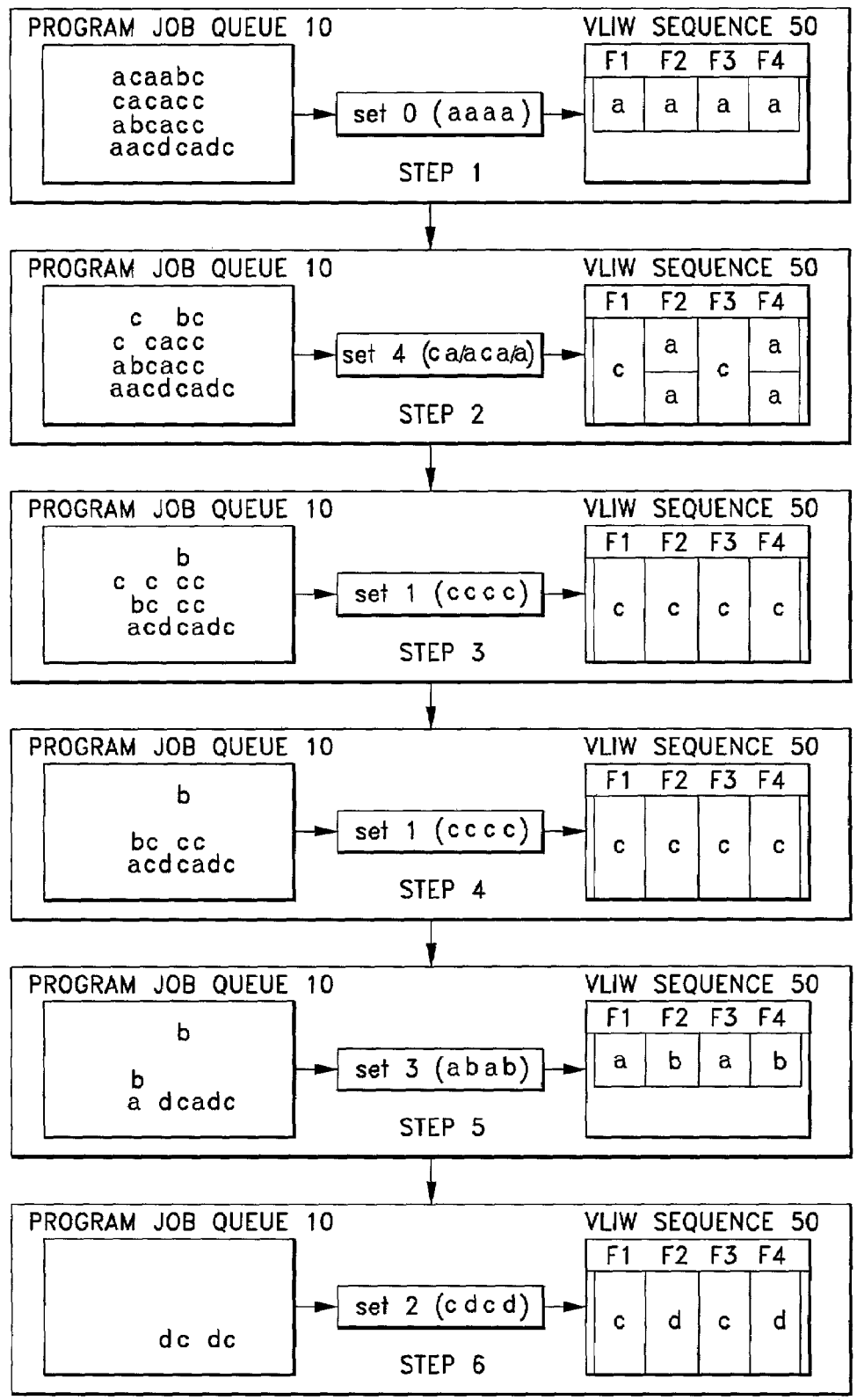
FIG. 7 is a block diagram illustrating the generation of a series of VLIW sequences according to a second embodiment of the present invention.

FIG. 7 is a block diagram which illustrates the present aspect of the invention in which a series of predetermined job combinations are sequentially selected to generate sequences of VLIWs based on a plurality of program jobs. As seen in FIG. 7, a sequence of six steps are represented to depict the generation of six VLIW sequences based on the instructions in the twenty-six program jobs of program job queue 10 shown in FIG. 6.

In step 1 of FIG. 7, task manager 21 accesses program job queue 10 to identify the remaining types of jobs. Based on the aforementioned rules, task manager 21 selects predetermined job combination set 0, which is comprised of four type "a" jobs. Task manager 21 then selects the next four remaining type "a" jobs from program job queue 10. No dummy, temporary jobs are needed for this predetermined job combination, so none are created. Next, a VLIW sequence is created based on the four selected type "a" jobs, as depicted in VLIW sequence 50, and is executed.

In step 2 of FIG. 7, task manager 21 accesses program job queue 10 to identify the remaining types of jobs, and then selects predetermined job combination set 4, which is comprised of two type "c" jobs and four type "a" jobs. As mentioned above, each type "a" job executes in one-half the time of a type "c" job. Task manager 21 then selects the next two remaining type "c" jobs and the next four remaining type "a" jobs from program job queue 10. No dummy, temporary jobs are needed for this predetermined job combination, so none are created. Next, a VLIW sequence is created based on the two selected type "c" jobs and the four selected type "a" jobs, as depicted in VLIW sequence 50, and is executed.

In a similar fashion, VLIW sequences are created and executed in steps three to six of FIG. 7 based on selected predetermined job combination sets 1, 1, 3 and 2, respectively. It can be seen in FIG. 7 that program job queue 10 is empty after step six such that no more program jobs are available for processing. In this manner, predetermined job combinations are utilized to efficiently create VLIW sequences in which the instruction fields contain a substantially equal number of instructions from the start to the end of the VLIW sequence. Accordingly, the number of machine cycles for which each computing functional unit has a no-operation instruction is greatly reduced.

Figure 8:
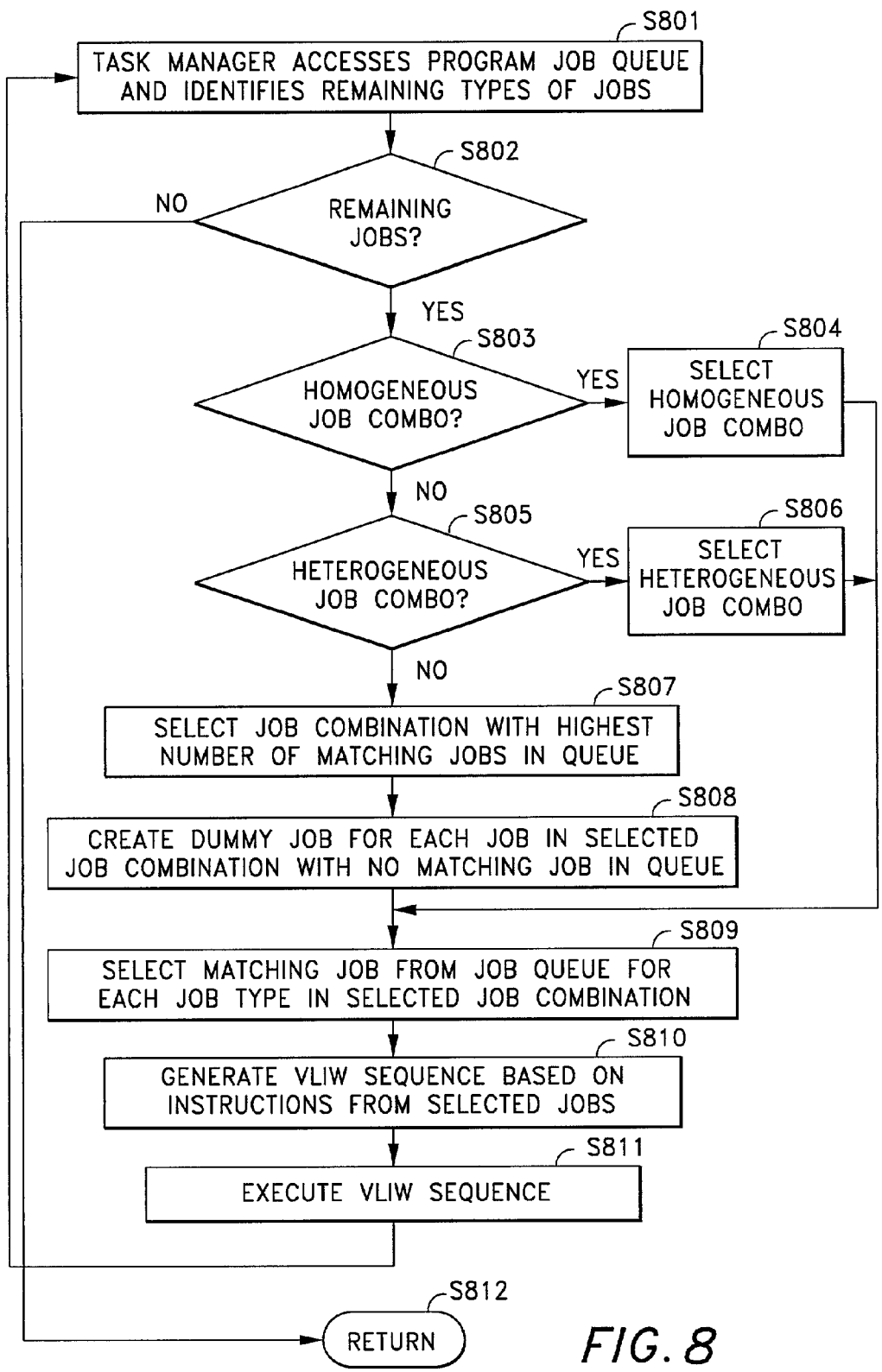
FIG. 8 is a flowchart for explaining the generation of a series of VLIW sequences according to a second embodiment of the present invention.

FIG. 8 is a flowchart which explains the aforementioned process for this aspect of the invention. As seen in step S801, task manager 21 accesses program job queue 10 and identifies the remaining jobs to be executed and their respective job types. In step S802, it is determined if there are any jobs remaining in program job queue 10. If not, flow passes to return in step S812. If there are remaining unexecuted jobs remaining, flow passes to step S803 in which it is determined whether there are sufficient remaining unexecuted jobs to support a homogeneous job combination, i.e. one in which all job codes are of the same type. If so, a homogeneous job combination is selected in step S804. If not, flow passes to step S805. In step S805, it is determined whether there are sufficient remaining unexecuted jobs to support a heterogeneous job combination, i.e. one in which the job codes are of two or more different types. If so, a heterogeneous job combination is selected in step S806. If not, flow passes to step S807.

In step S807, a job combination is selected which has the highest number of matching unexecuted jobs in program job queue 10. In this case, a temporary selected "dummy" job is created for each job code in the job combination selected in step S807 that does not have a matching unexecuted job in program job queue 10 (step S808). A dummy job preferably consists of a series of no-operation codes (NOPs), is created as needed, and then is discarded after execution of the VLIW sequence based on the selected jobs corresponding to the selected job combination.

Task manager 21 then selects a job from program job queue 10 which corresponds to each job code in the selected predetermined job combination (step S809). If a job code exists in the predetermined job combination for which there is no matching remaining job in program job queue 10, then a selected temporary dummy job is utilized, as described above. Next, in step S810, task manager 21 generates a VLIW sequence based on the sequential instructions in the selected jobs that correspond to the job codes of the selected job combination. Each instruction field of the VLIWs represents an instruction from one of the jobs, as discussed above, and also corresponds to one of the computing functional units of VLIW computing functional units 30. The generated VLIW sequence is then executed such that, for each VLIW, each computing functional unit executes the sequential instruction contained in the corresponding instruction field of the VLIW (step S811). Flow then passes to step S801 and the process is repeated. If it is determined in step S802 that there are no more jobs remaining in program job queue 10, then flow passes to return in step S812.

Another aspect of the invention allows the jobs in program job queue 10 to be selected and processed based not on predetermined job combinations, but simply based on the size of the remaining unexecuted jobs. In this manner, none, or few, machine cycles of any given computing functional unit are wasted during execution of each VLIW sequence. In this aspect, the plurality of jobs in program job queue 10 are easily identified by job size, and then a set of jobs are selected from program job queue 10 based on their priority position within the queue and based on matching job sizes. The selected jobs are used to generate a VLIW sequence which is then executed by VLIW computing functional units 30. After execution of the VLIW sequence, the process is repeated and a next VLIW sequence is generated and executed based on a set of jobs selected by job size. The process is repeated until all jobs in program job queue 10 are accessed, selected, incorporated into a VLIW sequence, and executed.

Figure 9:
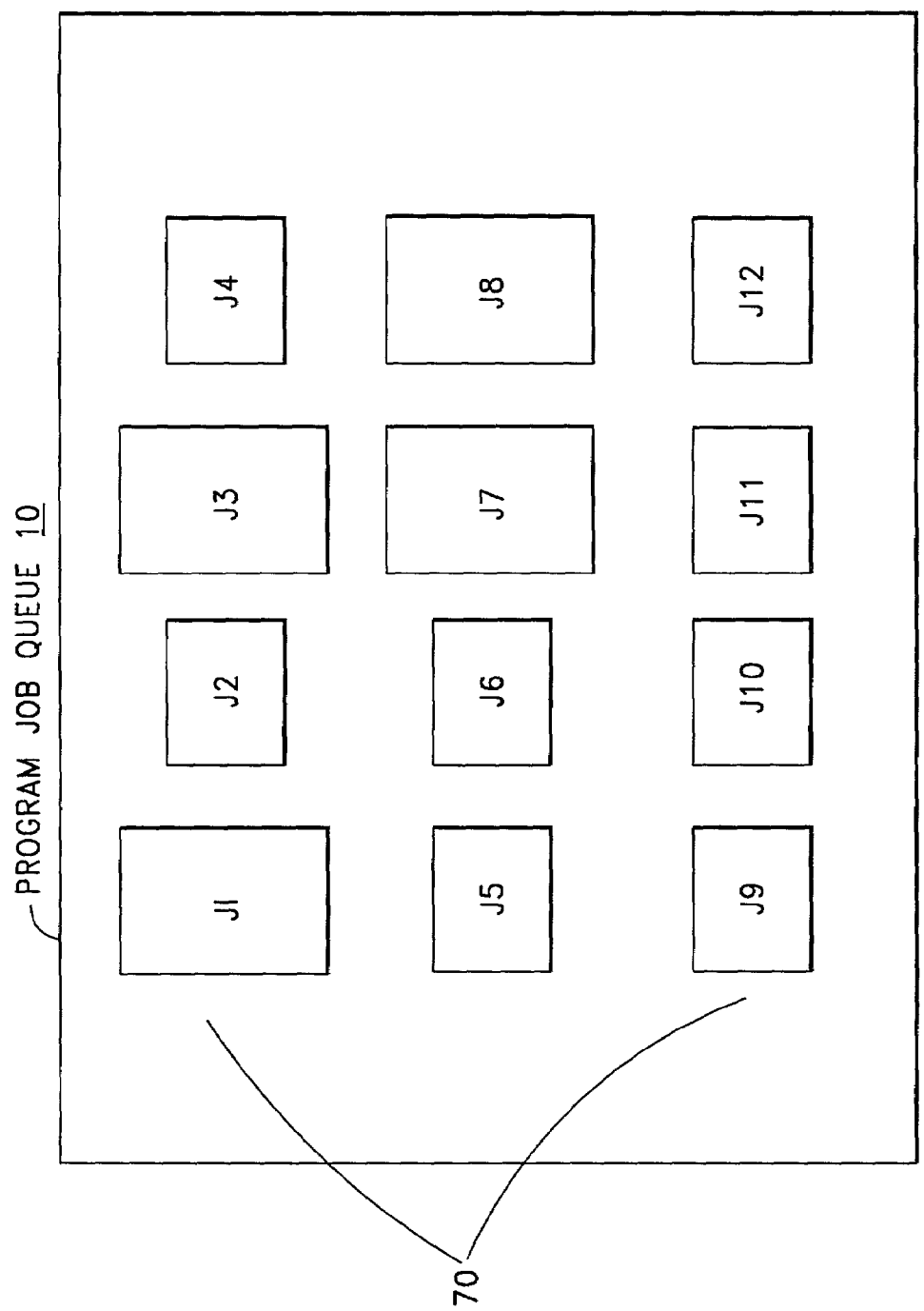
FIG. 9 is a block diagram illustrating a program job queue according to a third embodiment of the present invention.

FIG. 9 illustrates this aspect of the invention. In particular, FIG. 9 shows program job queue 10 according to this aspect of the invention, wherein program job queue 10 includes a plurality of program jobs 70 which are of different sizes. As seen in FIG. 9, program jobs 70 are comprised of jobs J1, J3, J7, and J8 which are of a first common size, and jobs J2, J4, J5, J6, J9, J10, J11 and J12 which are of a second common size that is approximately one-half the size of the first common size. The jobs of the first common size have the same, or a substantially equal, number of instructions so that all computing functional units complete execution of their respective instructions in the VLIW sequence at the same, or substantially the same, time. In a VLIW sequence based on selected jobs of only the first common size, all computing functional units would be fully utilized throughout the execution of the VLIW sequence and would finish execution of instructions at the same time. Similarly, jobs of the second common size have one-half, or substantially one-half, the number of instructions of the first common size so that all computing functional units complete execution of their respective instructions in the VLIW sequence at one-half, or substantially one-half, the time as those of the first common size. In a VLIW sequence based on selected jobs of only the second common size, all computing functional units would be fully utilized throughout the execution of the VLIW sequence and would finish execution of instructions at the same time, albeit in one-half the time of a VLIW sequence based only on jobs of the first common size.

In this manner, task manager 21 uses the sizes of program jobs 70 to determine which next set of jobs to select from program job queue 10 for generation of a next VLIW sequence for execution by VLIW computing functional units 30. In particular, task manager 21 accesses program job queue 10 and identifies the remaining jobs to be executed and their respective job sizes. Task manager 21 then determines a best job combination to use next based on the sizes of the identified remaining jobs. Preferably, the determination is based on the following order of priorities: (1) select a job for each computing functional units wherein each job is of the same size, such as either the first common size or the second common size; (2) if option (1) is not possible, then select jobs of different sizes such that the total number of instructions assigned to each computing functional unit is approximately the same (i.e. such that either a job of the first common size, or two jobs of the second common size are assigned to each computing functional units); and (3) if there are not sufficient remaining unexecuted jobs to achieve option (2), then select jobs from the remaining jobs that have the highest level of match between the computing functional units.

Task manager 21 then selects the jobs from program job queue 10 corresponding to the determination described above. Next, task manager 21 generates a VLIW sequence based on the sequential instructions in the selected jobs. Each instruction field of the VLIWs represents one of the selected jobs, as discussed above, and also corresponds to one of the computing functional units of VLIW computing functional units 30. The generated VLIW sequence is then executed such that, for each VLIW, each computing functional unit executes the sequential instruction contained in the corresponding instruction field of the VLIW. Task manager 21 then repeats the process to generate a next VLIW sequence for execution until there are no remaining program jobs in program job queue 10.

Figure 10:
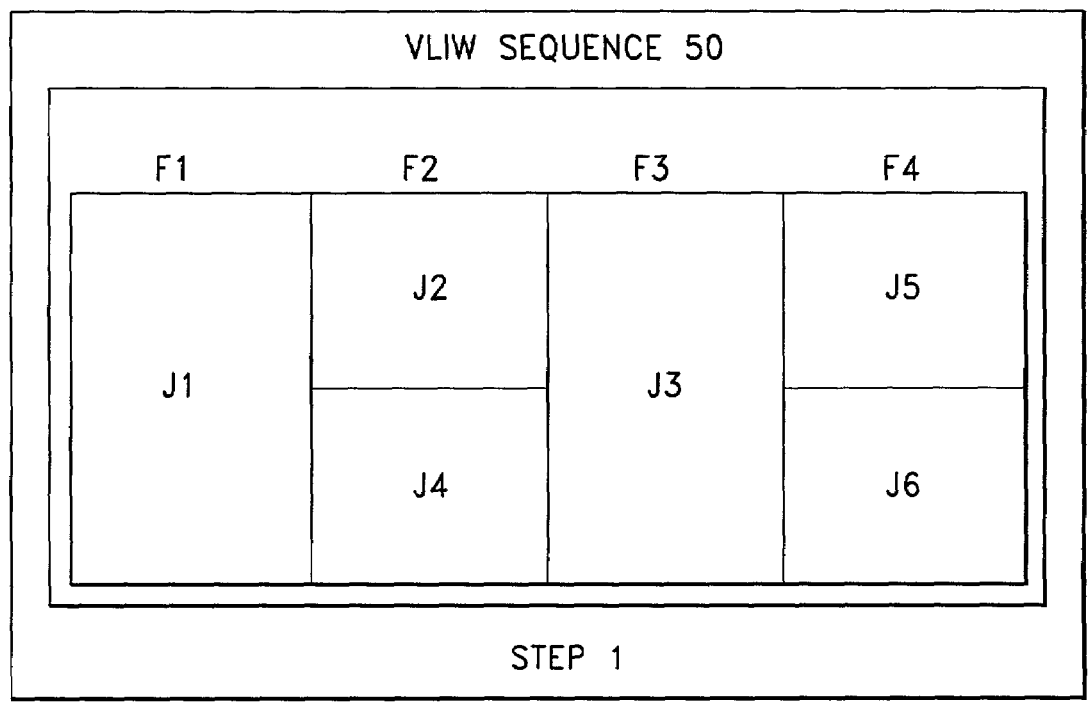
FIG. 10 is a block diagram illustrating the generation of a series of VLIW sequences according to a third embodiment of the present invention.
Figure 10:
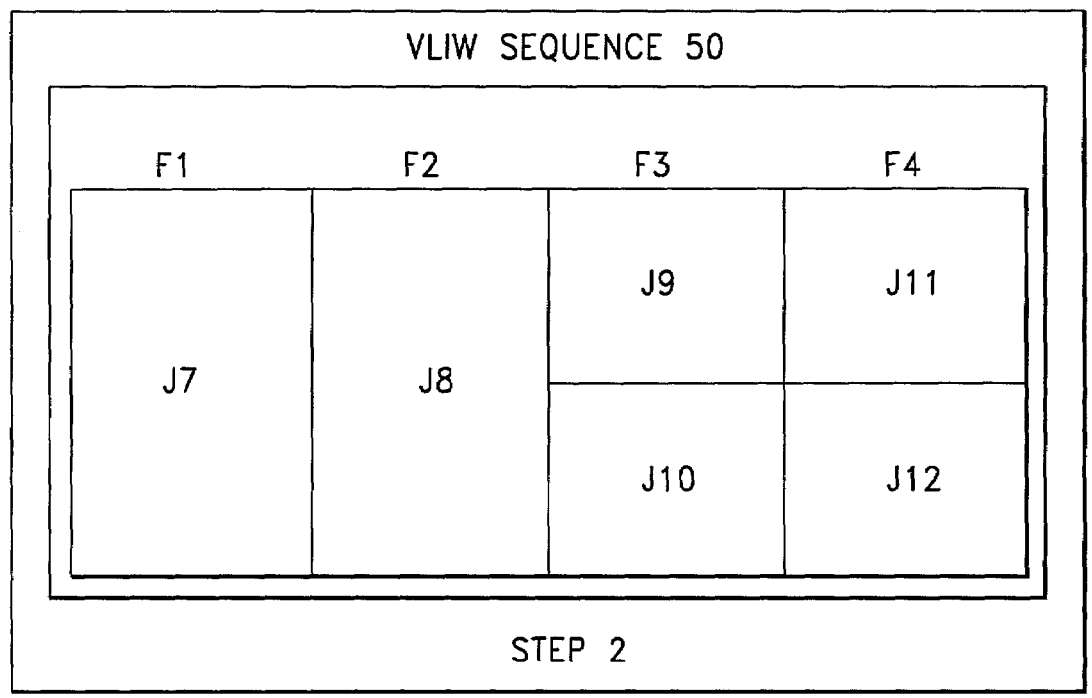

FIG. 10 is a block diagram which illustrates the present aspect of the invention in which a series of jobs are sequentially selected to generate sequences of VLIWs. As seen in FIG. 10, a sequence of two steps are represented to depict the generation of two VLIW sequences based on the instructions in the twelve program jobs of program job queue 10 shown in FIG. 9.

In step 1 of FIG. 10, task manager 21 accesses program job queue 10 of FIG. 9 to identify the sizes of the remaining jobs. Based on the aforementioned rules, task manager 21 selects jobs J1 to J6. Jobs J1 and J3 are of the first common size, and J2, J4, J5 and J6 are of the second common size, which is approximately one-half the size of the first common size. Therefore, job J1 is assigned to instruction field F1 and job J3 is assigned to instruction field F3, both of jobs J2 and J4 are assigned to instruction field F2, and both of jobs J5 and J6 are assigned to instruction field F4. In this manner, approximately the same number of instructions will be executed by each of the computing functional units. Next, a VLIW sequence is created based on the selected jobs as depicted in VLIW sequence 50, and the VLIW sequence is executed.

In step 2 of FIG. 10, task manager 21 accesses program job queue 10 of FIG. 9 to identify the sizes of the remaining jobs. Based on the aforementioned rules, task manager 21 selects jobs J7 to J12. Jobs J7 and J8 are of the first common size, and J9 to J12 are of the second common size, which is approximately one-half the size of the first common size. Therefore, job J7 is assigned to instruction field F1 and job J8 is assigned to instruction field F2, both of jobs J9 and J10 are assigned to instruction field F3, and both of jobs J11 and J12 are assigned to instruction field F4. In this manner, approximately the same number of instructions will be executed by each of the computing functional units. Next, a VLIW sequence is created based on the selected jobs as depicted in VLIW sequence 50, and the VLIW sequence is executed.

It can be appreciated that program job queue 10 of FIG. 9 is empty after step two of FIG. 10 such that no more program jobs are available for processing. In this manner, the sizes of the remaining unexecuted jobs are utilized to efficiently create VLIW sequences in which the instruction fields contain a substantially equal number of instructions from the start to the end of the VLIW sequence. Accordingly, the number of machine cycles for which each computing functional unit has a no-operation instruction is greatly reduced.

Figure 11:
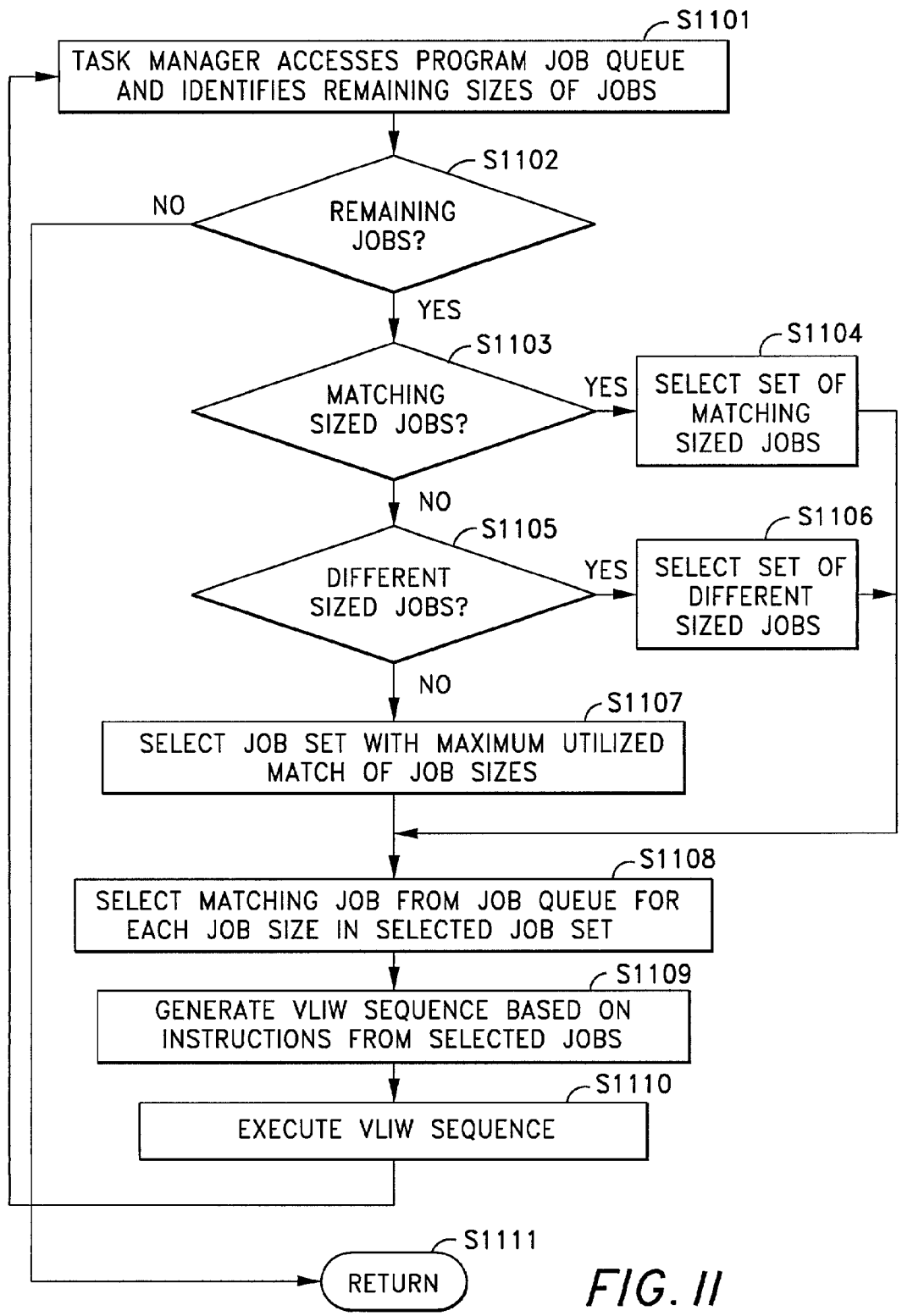
FIG. 11 is a flowchart for explaining the generation of a series of VLIW sequences according to a third embodiment of the present invention.

FIG. 11 is a flowchart which explains the aforementioned process for this aspect of the invention. As seen in step S1101, task manager 21 accesses program job queue 10 and identifies the remaining jobs to be executed and determines their respective sizes. In step S1102, it is determined if there are any jobs remaining in program job queue 10. If not, flow passes to return in step S1111. If there are remaining unexecuted jobs remaining, flow passes to step S1103 in which it is determined whether there are sufficient remaining unexecuted jobs of the same job size for each of the computing functional units. If so, jobs of the same job size, either the first common size or the second common size, are selected for the computing functional units in step S1104. If not, flow passes to step S1105 in which it is determined whether there are sufficient remaining unexecuted jobs to create a combination of jobs of different sizes that have approximately the same number of total instructions for each computing functional unit, i.e. either one job of the first common size or two jobs of the second common size is assigned to each computing functional unit. If so, a set of jobs of different sizes are selected such that approximately the same number of total instructions will be executed in each computing functional unit (step S1106). If not, flow passes to step S1107.

In step S1107, a job combination is selected which has the highest number of matching unexecuted jobs in program job queue 10. Task manager 21 then selects the jobs from program job queue 10 according to the selected job set (step S1108). Next, in step S1109, task manager 21 generates a VLIW sequence based on the sequential instructions in the selected jobs. Each instruction field of the VLIWs represents an instruction from one of the selected jobs, as discussed above, and also corresponds to one of the computing functional units of VLIW computing functional units 30. The generated VLIW sequence is then executed such that, for each VLIW, each computing functional unit executes the sequential instruction contained in the corresponding instruction field of the VLIW (step S1110). Flow then passes to step S1101 and the process is repeated. If it is determined in step S1102 that there are no more jobs remaining in program job queue 10, then flow passes to return in step S1111.

Based on the above discussion and accompanying figures, it can be appreciated that the present invention provides for management and control of the order of instruction codes for execution in a computing architecture comprised of a plurality of computing functional units thereby completing a plurality of jobs in a job queue. In this manner, the amount of unused machine cycles in each of the computing functional units during execution of each VLIW sequence is reduced.

The invention has been described with particular illustrative embodiments. It is to be understood that the invention is not limited to the above-described embodiments and that various changes and modifications may be made by those of ordinary skill in the art without departing from the spirit and scope of the invention. In particular, and as stated above, the invention can be used to manage various types of network devices, not just network printers.

What is claimed is:

1. A method for controlling an order of instructions executed by a computing architecture comprised of a plurality of computing functional units, for completing a plurality of jobs in a job queue, said method comprising:
   a selecting step of selecting at least one job from the job queue for each of the computing functional units, each job containing a plurality of sequential instructions;
   a first generating step of generating a first sequence of long instruction words based on the sequential instructions contained in the selected jobs, each long instruction word having a plurality of instruction fields, each instruction field corresponding to one of the computing functional units and containing a sequential instruction;
   a first execution step of sequentially executing the first sequence of long instruction words by the computing architecture, each computing functional unit executing the sequential instruction in the corresponding instruction field of each long instruction word;
   a detecting step of detecting when each of the computing functional units are in a free state, detecting when the first sequence of long instruction words is completed, or, in the case that the computing architecture includes a sub-processor, detecting when the first sequence of long instruction words is being executed;
   a halting step of halting, in the case that the computing architecture does not include a sub-processor, execution of the first sequence of long instruction words when at least one of the computing functional units is detected in a free state;
   a second generating step of generating, when at least one of the computing functional units is detected in a free state, a second sequence of long instruction words which includes instructions from a selected new job from the job queue for each computing functional unit detected to be in a free state;
   a copying step of copying the second sequence of long instruction words into the first sequence of long instruction words; and
   a resuming step of resuming, in the case that the computing architecture does not include a sub-processor, execution of the first sequence of long instruction words by the plurality of computing functional units.

2. A method according to claim 1, wherein the second generating step further includes selecting a new job from the job queue for each of the computing functional units detected to be in a free state.

3. A method according to claim 2, wherein the second generating step further includes halting execution of the first sequence of long instruction words.

4. A method according to claim 3, wherein the second generating step further includes copying the first sequence of long instruction words to the second sequence of long instruction words, and adding the sequential instructions from each selected new job to the instruction field in the second sequence of long instruction words corresponding to each computing functional unit detected to be in a free state.

5. A method according to claim 4, wherein the second generating step is performed by one of the computing functional units.

6. A method according to claim 4, wherein a set of memory registers are used in the first execution step during execution of the first sequence of long instruction words and wherein the set of memory registers are saved before copying the first sequence of long instruction words to the second sequence of long instruction words.

7. A method according to claim 6, wherein the saved set of memory registers are retrieved and used in the second execution step during execution of the second sequence of long instruction words.

8. A method according to claim 1, wherein each of the jobs selected in the selecting step contain a same number of sequential instructions.

9. A method according to claim 1, wherein each of the jobs selected in the selecting step are of substantially a same number of sequential instructions.

10. A method according to claim 8, wherein the second sequence of long instructions is based on sequential instructions from a plurality of jobs, each job containing a same number of sequential instructions.

11. A method according to claim 9, wherein the second sequence of long instructions is based on sequential instructions from a plurality of jobs, each job containing substantially a same number of sequential instructions.

12. A method according to claim 1, wherein the selecting step includes identifying the remaining types of jobs in the job queue, selecting a job combination from a set of predetermined job combinations, each predetermined job combination containing a plurality of codes each of which corresponds to a type of job, and selecting a job from the job queue which corresponds to each code in the selected job combination.

13. A method according to claim 12, wherein at least one of the codes in the selected job combination corresponds to a type of job for which there is no corresponding job in the job queue, and wherein a temporary job is created to correspond to each code for which there is no corresponding job in the job queue.

14. A method according to claim 13, wherein each temporary job contains a plurality of no-operation instructions.

15. A method according to claim 13, wherein each temporary job is discarded after the first sequence of long instruction words is generated.

16. A method for controlling an order of instructions executed by a computing architecture comprised of a plurality of computing functional units, for completing a plurality of jobs in a job queue, each job containing a plurality of sequential instructions, said method comprising:

a first executing step of sequentially executing a first sequence of long instruction words based on the sequential instructions contained in a set of selected jobs, each long instruction word having a plurality of sub-instruction fields, each sub-instruction field corresponding to one of the computing functional units and containing a sequential instruction for execution by the corresponding computing functional unit;

a detecting step of detecting when each of the computing functional units are in a free state;

a second generating step of generating, when at least one of the computing functional units is detected in a free state, a second sequence of long instruction words, the second generating step including halting execution of the first sequence of long instruction words, selecting a new job from the job queue for each computing functional unit detected to be in a free state, creating a second sequence of long instruction words from the instructions from each selected new job, and copying the second sequence of long instruction words into the first sequence of long instruction words; and a resuming step of resuming execution of the first sequence of long instruction words by the plurality of computing functional units.

17. A method for controlling an order of instructions executed by a computing architecture comprised of a plurality of computing functional units, for completing a plurality of jobs in a job queue, said method comprising:

a selecting step of selecting at least one job from the job queue for each of the computing functional units, the selecting step including identifying the remaining types of jobs in the job queue, selecting a job combination from a set of predetermined job combinations based on the identified remaining types of jobs in the job queue, each predetermined job combination containing a plurality of codes each of which corresponds to a type of job containing a substantially same number of sequential instructions, selecting a job from the job queue which corresponds to each code in the selected job combination, and creating, in the event that the job queue does not contain a job corresponding to one of the codes in the selected job combination, a selected temporary job which corresponds to the code for which there is no corresponding job in the job queue;

a generating step of generating a sequence of long instruction words based on the sequential instructions contained in the selected jobs, each long instruction word having a plurality of instruction fields, each instruction field corresponding to one of the computing functional units and containing a sequential instruction; and an execution step of sequentially executing the sequence of long instruction words by the computing architecture, each computing functional unit executing the sequential instruction in the corresponding instruction field of each long instruction word.

18. An apparatus for controlling an order of instructions executed by a computing architecture comprised of a plurality of computing functional units, for completing a plurality of jobs in a job queue, comprising:

a selecting unit constructed to select at least one job from the job queue for each of the computing functional units, each job containing a plurality of sequential instructions;

a first generating unit constructed to generate a first sequence of long instruction words based on the sequential instructions contained in the selected jobs, each long instruction word having a plurality of instruction fields, each instruction field corresponding to one of the computing functional units and containing a sequential instruction;

a first execution unit constructed to sequentially execute the first sequence of long instruction words by the computing architecture, each computing functional unit executing the sequential instruction in the corresponding instruction field of each long instruction word;

a detecting unit constructed to detect when each of the computing functional units are in a free state, to detect when the first sequence of long instruction words is completed, or, in the case that the computing architecture includes a sub-processor, to detect when the first sequence of long instruction words is being executed;

a halting unit constructed to halt, in the case that the computing architecture does not include a sub-processor, execution of the first sequence of long instruction words when at least one of the computing functional units is detected in a free state;

a second generating unit constructed to generate, when at least one of the computing functional units is detected in a free state, a second sequence of long instruction words which includes instructions from a selected new job from the job queue for each computing functional unit detected to be in a free state;

a copying unit constructed to copy the second sequence of long instruction words into the first sequence of long instruction words; and a resuming unit constructed to resume, in the case that the computing architecture does not include a sub-processor, execution of the first sequence of long instruction words by the plurality of computing functional units.

19. An apparatus for controlling an order of instructions executed by a computing architecture comprised of a plurality of computing functional units, for completing a plurality of jobs in a job queue, each job containing a plurality of sequential instructions, comprising:

a first executing unit constructed to sequentially execute a first sequence of long instruction words based on the sequential instructions contained in a set of selected jobs, each long instruction word having a plurality of sub-instruction fields, each sub-instruction field corresponding to one of the computing functional units and containing a sequential instruction for execution by the corresponding computing functional unit;

a detecting unit constructed to detect when each of the computing functional units are in a free state;

a second generating unit constructed to generate, when at least one of the computing functional units is detected in a free state, a second sequence of long instruction words, wherein said second generating unit is operable to halt execution of the first sequence of long instruction words, to select a new job from the job queue for each computing functional unit detected to be in a free state, to create a second sequence of long instruction words from the instructions from each selected new job, and to copy the second sequence of long instruction words into the first sequence of long instruction words; and a resuming unit constructed to resume execution of the first sequence of long instruction words by the plurality of computing functional units.

20. An apparatus for controlling an order of instructions executed by a computing architecture comprised of a plurality of computing functional units, for completing a plurality of jobs in a job queue, comprising:

a selecting unit constructed to select at least one job from the job queue for each of the computing functional units, wherein said selecting unit is operable to identify the remaining types of jobs in the job queue, to select a job combination from a set of predetermined job combinations based on the identified remaining types of jobs in the job queue, each predetermined job combination containing a plurality of codes each of which corresponds to a type of job containing a substantially same number of sequential instructions, to select a job from the job queue which corresponds to each code in the selected job combination, and to create, in the event that the job queue does not contain a job corresponding to one of the codes in the selected job combination, a selected temporary job which corresponds to the code for which there is no corresponding job in the job queue;

a generating unit constructed to generate a sequence of long instruction words based on the sequential instructions contained in the selected jobs, each long instruction word having a plurality of instruction fields, each instruction field corresponding to one of the computing functional units and containing a sequential instruction; and an execution unit constructed to sequentially execute the sequence of long instruction words by the computing architecture, each computing functional unit executing the sequential instruction in the corresponding instruction field of each long instruction word.

* * * * *